(12) United States Patent
Chenon (10) Patent No.: US 9,852,128 B2
(45) Date of Patent: Dec. 26, 2017

(54) TRANSLATION VALIDATION

(71) Applicant: INTERNATIONAL BUSINESS MACHINES CORPORATION, Armonk, NY (US)

(72) Inventor: Christophe D. A. Chenon, Paris (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/246,861

(22) Filed: Apr. 7, 2014

(65) Prior Publication Data

US 2014/0324411 A1     Oct. 30, 2014

(30) Foreign Application Priority Data

Apr. 24, 2013   (GB) .................................. 1307349.9

(51) Int. Cl.
G06F 17/28    (2006.01)

(52) U.S. Cl.
CPC .......... *G06F 17/28* (2013.01); *G06F 17/2836* (2013.01); *G06F 17/2854* (2013.01)

(58) Field of Classification Search
None
See application file for complete search history.

(56) References Cited

U.S. PATENT DOCUMENTS

| | | | |
|---|---|---|---|
| 6,285,978 B1 | 9/2001 | Bernth et al. | |
| 7,496,496 B2 | 2/2009 | Quirk et al. | |
| 8,185,377 B2 | 5/2012 | Zhou | |
| 8,209,165 B2 | 6/2012 | Whitelock et al. | |
| 8,244,519 B2 | 8/2012 | Bicici et al. | |
| 2003/0115552 A1* | 6/2003 | Jahnke et al. | 715/536 |
| 2007/0219774 A1 | 9/2007 | Quirk et al. | |

(Continued)

FOREIGN PATENT DOCUMENTS

CN    101187923 A    5/2008

OTHER PUBLICATIONS

Denkowski, et al., "Meteor 1.3: Automatic Metric for Reliable Optimization and Evaluation of Machine Translation Systems", Proceedings of the 6th Workshop on Statistical Machine Translation, Jul. 30-31, 2011, pp. 85-91, Edinburgh, Scotland, UK, 2011.

(Continued)

*Primary Examiner* — Marivelisse Santiago Cordero
*Assistant Examiner* — Keara Harris
(74) *Attorney, Agent, or Firm* — Law Office of Jim Boice (57) ABSTRACT

A method and/or computer program product validates a translation memory against terminology dictionary of a source and target language. For each source term, occurrences of a particular source term within source segments are identified, where an occurrence is determined according to grammar rules. For each identified source term occurrence in a source segment, a closeness score between a corresponding target term and a corresponding occurrence of the corresponding target term in a target segment is calculated. Each identified occurrence of a source term in a source segment is reported, as well as a closeness score, for each identified occurrence, between each identified occurrence and a corresponding target term in a target segment.

15 Claims, 10 Drawing Sheets

(56) References Cited

U.S. PATENT DOCUMENTS

2009/0157386 A1* 6/2009 Zhou ................. G06F 17/28
  704/9
2010/0138213 A1 6/2010 Bicici et al.
2012/0136647 A1* 5/2012 Kumano .................. 704/2
2012/0143593 A1* 6/2012 Wu .................... G06F 17/2836
  704/2

OTHER PUBLICATIONS

P. Koehn, "Statistical Significance Tests for Machine Translation Evaluation", ACL, Proceedings of EMNLP 2004 pp. 388-395.
Przybocki, et al., "Edit Distance: A Metric for Machine Translation Evaluation", Fifth International Conference on Resources and Evaluation, 2006, pp. 2038-2043.
SDL Trados Studio, "Discover leading translation software", SDL PLC, Retrieved Apr. 7, 2014, pp. 1-8.
Terminotix, "Synchroterm", Terminotix Inc., Retrieved Apr. 7, 2014, pp. 1-2.
APSIC, "Easy Quality Assurance and Terminology", ApSIC, S.L., Retrieved Mar. 14, 2014, pp. 1-2.
Widdows, Ben, "Patents Act 1977: Search Report under Section 17(5)" for UK Patent Application No. GB1307349.9, Intellectual Property Office, Newport, South Wales, UK, Oct. 24, 2013.

* cited by examiner

| Terminology Dictionary 102 | |
| --- | --- |
| Source Terms / Language1:English | Target Terms / Language2:French |
| DTerm1.S.1: computer | DTerm1.T.1: ordinateur |
| DTerm1.S.1: computer | DTerm1.T.2: calculateur |
| DTerm2.S: computer-aided translation | DTerm2.T: traduction assistée par ordinateur |
| ... | ... |
| DTermN.S: ... | DTermN.T: ... |

FIG. 2B

| Translation Memory 104 | |
|---|---|
| Source Segments / Language1:English | Target Segments / Language2:French |
| Seg1.S: "a full set of general computer-aided translations that came in yesterday" | Seg1.T: "tout un ensemble de traductions généralement assistées par ordinateur qui sont arrivées hier" |
| Seg2.S: ... | Seg2.T: ... |
| ... | ... |
| SegN.S: ... | SegN.T: ... |

FIG. 2C

| Validation Report 106 |
|---|
| +DTermX<br>+DTermX+1<br>+DTermX+2 |

FIG. 2D

| Validation Report 106 |
|---|

-DTerm X
  DTerm ="build"
  Occurrences = 5
  -OccurrenceN.1=Not matched
    Closeness Score = 100%
    Source Segment= "Apache Ant is an open source, Java-based build tool."
    Target Segment = "Apache Ant est un outil de development Java source ourverte"
  -OccurrenceN.2=Exact Match
    Closeness Score = 100%
    Source Segment="The Eclipse support for Ant allows you to create and run Ant build files from the Workbench."
    Target Segment="La prise en charge Eclipse de Ant vous permet de creer et d'executer des ficheriers de generation Ant a partir du Workbench"
  +occurrenceN.3
  +occurrenceN.4
  +occurrenceN.5
+DTermX+1
+DTermX+2

FIG. 2E

| Validation Report 106 |
|---|
| +DTermX<br>-DTermX+1<br>  Occurrences = 5<br>  Source Term = "computer-aided translation"<br>  Target Term = "traductions assistées par ordinateur"<br>  +Segment N<br>  -Segment N+1<br>  Match = Some Match<br>  Closeness Score = 80%<br>  Source segment = "general computer-aided translations"<br>  Target segment = "traductions généralement assistées par ordinateur"<br>  +Segment N+2<br>  +Segment N+3<br>  +Segment N+4<br>+DTermX+2 |

FIG. 2F

Translation Validation Module 100

Translation Validation Method 200

Rule Match Engine 110

Fuzzy Match Engine 112

Results Data 114

Report Renderer 116

FIG. 2G

Translation Validation Method 200

- 202 For each translation memory
  - 204 For each segment. Record duplicate segment.
  - 206 End of segments? — No → back to 204
  - Yes ↓
  - 208 For each source term in terminology dictionary, strip code and record segment if rules based occurrence in translation memory segment source
  - 210 For each matched source term, record closeness score if fuzzy match of corresponding target term found in corresponding target segment.
  - 212 End of occurrences? — No → back to 210
  - Yes ↓
  - 214 End of terms? — No → back to 208
  - Yes ↓
  - 216 Create report from recorded dictionary terms and recorded closeness score

TRANSLATION VALIDATION

BACKGROUND

This invention relates to a tool and method for validating translations.

Computer-assisted translation tools measure quality metrics of existing translations in relation to a bilingual dictionary. Computer-assisted translation tools are useful for translation professionals: to help them assess if a translation conforms to a reference bilingual dictionary; to measure the amount of work required to make a translation meet the desired standards; and/or to know which are the areas to focus on to improve a given body of translations.

Many computer-assisted translation tools use established resources such as terminology dictionaries and translation memories. Generally, a first step in the translation of a large body of text involves setting up a bilingual terminology dictionary and a second step is the translation of the body of text into a translation memory. A terminology dictionary defines the most important terms and concepts involved in the body of text. A translation memory is a large database that stores all the correspondence between source and target segments for a translation. A translation memory facilitates reuse and consistency checking inside a large body of work.

At various points in the translation process, it is useful to be able to measure the relative discrepancy between a given translation memory and a terminology dictionary. This can be done after translation for the purposes of: 1) measuring the extent to which the translation process respects the guidelines set forth by the terminology dictionary; 2) assessing if the terminology dictionary seems adequate for structuring the translation; or 3) assessing the quantity of work to be done to improve a translation so that its quality matches preset criteria.

SDL Trados Studio is a known translation verification product comprising analogy computation between translated terms and translated segments. SDL and Trados are trademarks of SDL PLC.

SynchroTerm is a known translation verification product that bases research on a term basis. Both source and target language can be searched simultaneously. Some morphological capabilities are included so that search can be performed in ten languages. SynchroTerma and Terminotix are trademarks of Terminotix Inc.

ApSIC Xbench is a known translation verification tool that bases research on a term basis. ApSIC and Xbench are trademarks of ApSIC SL.

All the above tools use translation memory and terminology dictionaries.

SUMMARY

In one embodiment of the present invention, a system validates a translation memory against a terminology dictionary, said terminology dictionary comprising source terms and corresponding target terms, said translation memory comprising source segments and corresponding target segments, said system comprising: a rule match hardware engine for identifying, for each source term, occurrences of a particular source term within source segments, wherein an occurrence is determined according to grammar rules; a fuzzy match hardware engine for calculating, for each identified source term occurrence in a source segment, a closeness score between a corresponding target term and a corresponding occurrence of the corresponding target term in a target segment; and a report generator for reporting each identified occurrence of a source term in a source segment, and a closeness score, for said each identified occurrence, between said each identified occurrence and a corresponding target term in a target segment.

In one embodiment of the present invention, a method and/or computer program product validates a translation memory against terminology dictionary of a source and target language. For each source term, occurrences of a particular source term within source segments are identified, where an occurrence is determined according to grammar rules. For each identified source term occurrence in a source segment, a closeness score between a corresponding target term and a corresponding occurrence of the corresponding target term in a target segment is calculated. Each identified occurrence of a source term in a source segment is reported, as well as a closeness score, for each identified occurrence, between each identified occurrence and a corresponding target term in a target segment.

BRIEF DESCRIPTION OF THE SEVERAL VIEWS OF THE DRAWINGS

Preferred embodiments of the present invention will now be described, by way of example only, with reference to the following drawings in which.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
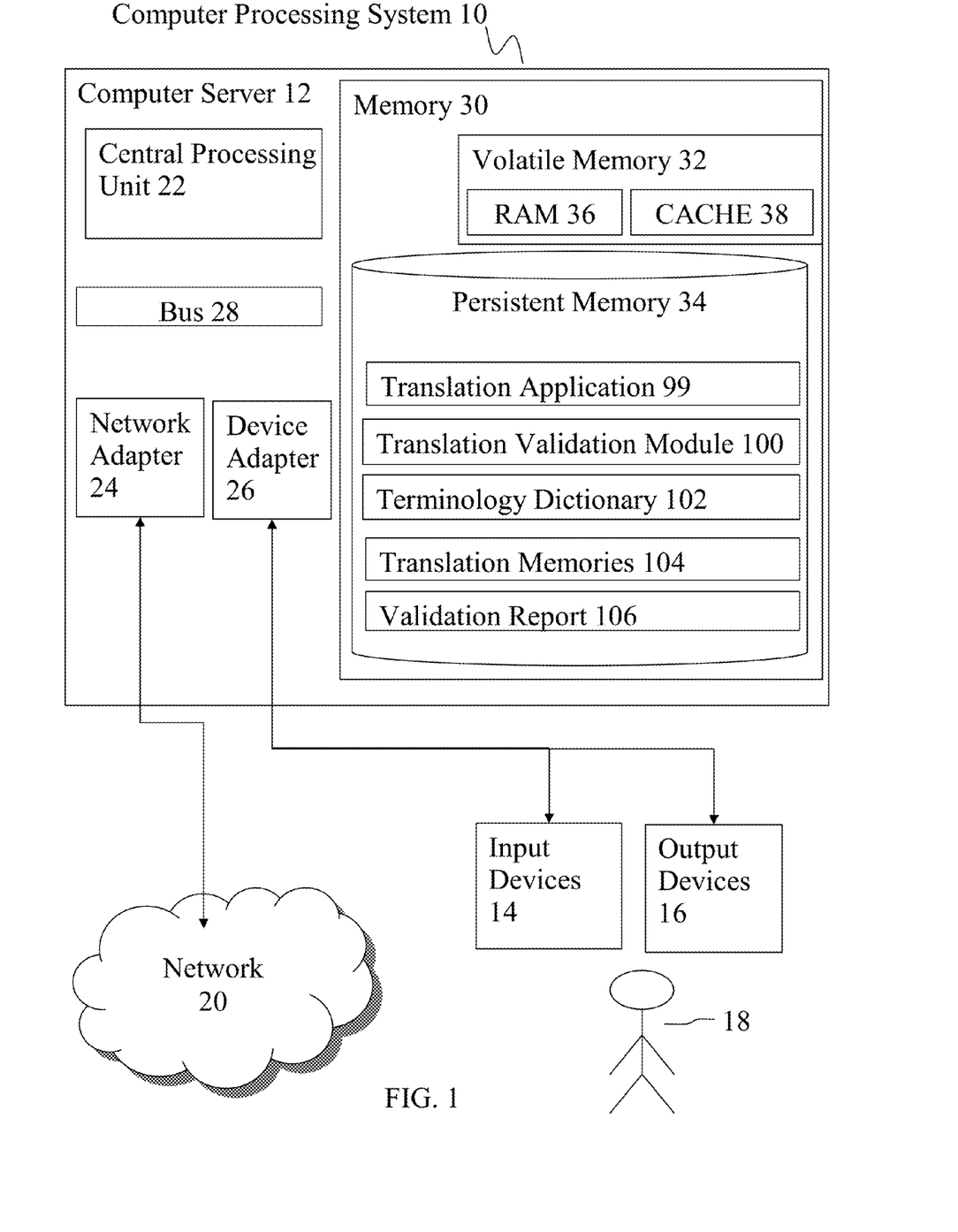
FIG. 1 is a deployment diagram of the preferred embodiment.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: increment or decrement a value in register (not shown); transfer a value from memory 30 to a register or vice versa; take instructions from a different location in memory if a condition is true or false (also known as a conditional branch instruction); and add or subtract the values in two different registers and put the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

Program modules configured to carry out the functions of the preferred embodiment comprise: translation application 99, translation validation module 100, terminology dictionary 102, one or more translation memories 104 and validation report 106. Further program modules that support the preferred embodiment but are not shown including firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Translation application 99 is a standalone program operating at an application level for creating one or more translation memories 104 from independent language resources. Alternatively the translation memories are created manually by a human translator.

Translation validation module 100, when operated by computer server 12, provides a translation validation tool for validating one or more translation memories 104 against a terminology dictionary 102 in order to produce a validation report 106. According to a preferred embodiment these components will be described in more detail with respect to accompanying figures.

Figure 2A:
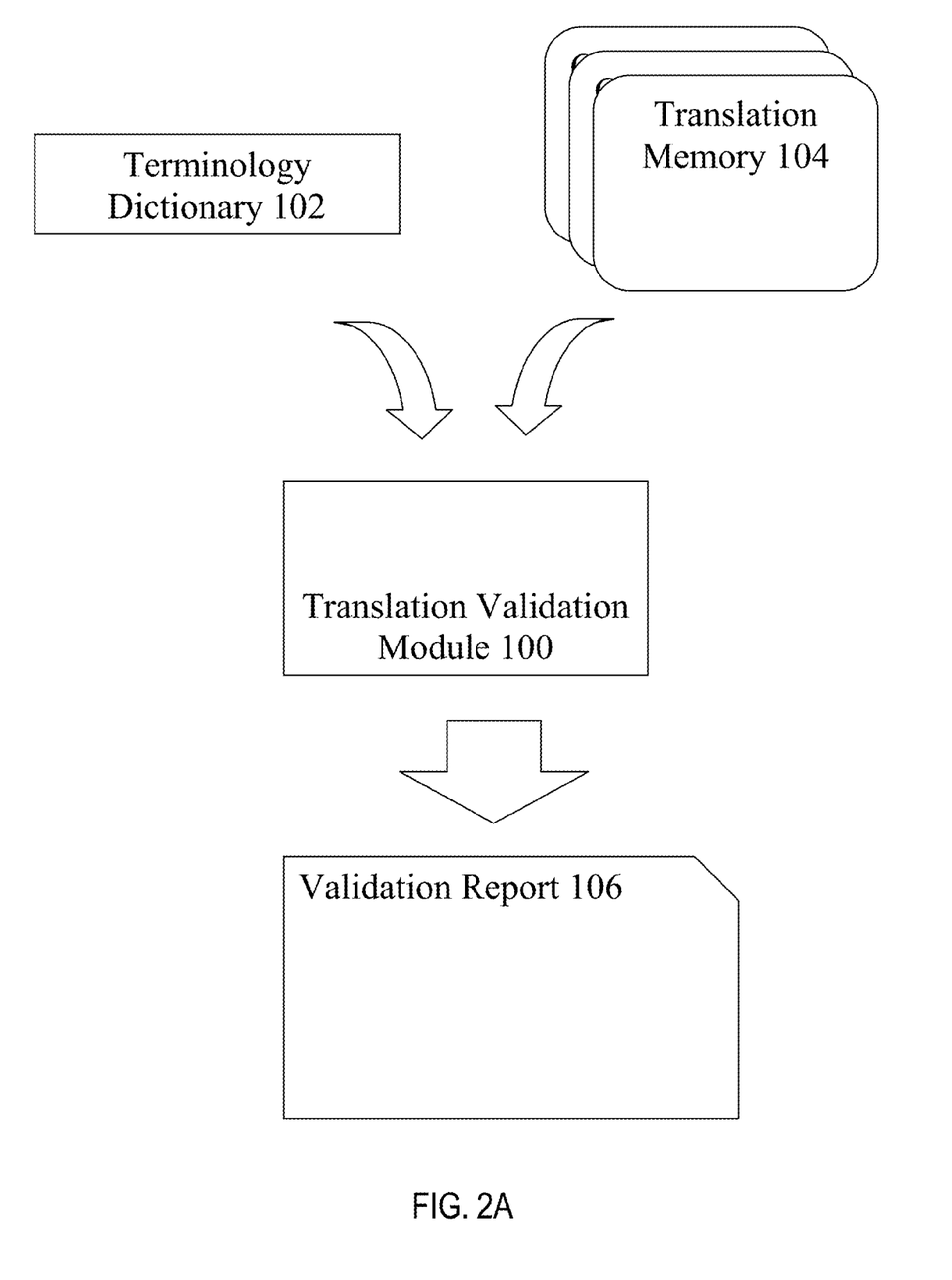
FIGS. 2A to 2G are component diagrams of the preferred embodiment.

Referring to FIG. 2A, terminology dictionary 102 and one or more translation memories 104 are input to translation validation module 100. Validation report 106 is show as output from translation validation module 100.

Figure 2B:
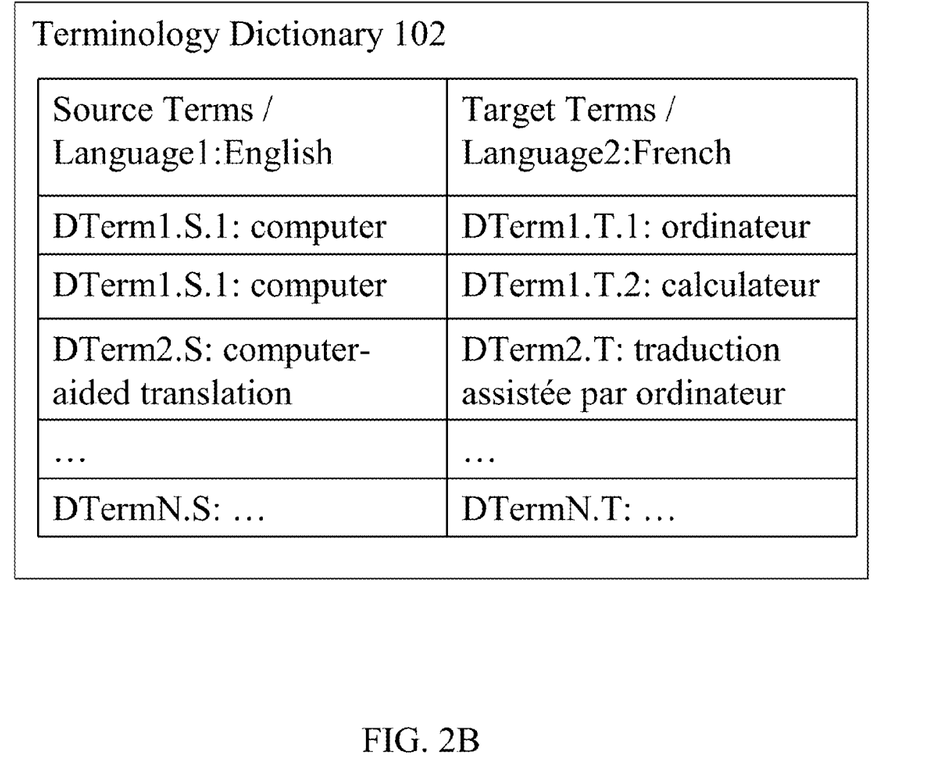

Referring to FIG. 2B, terminology dictionary 102 comprises terminology pairs (generally referred to as DTerm1, DTerm2 . . . DTermN) of source terms (S) and target terms (T) (specifically referred to as DTerm1.S/DTerm1.T; DTerm2.S/DTerm2.T; . . . ; DTermN.S/DTermN.T) in a Language1 and a Language2. For some terms, there exists a further translation. For instance, DTerm1.S.1 (the first dictionary term in the first language) comprises "computer" and corresponding DTerm1.T.1 (the first dictionary term in the second language) comprises "ordinateur". A further translation of DTerm1.S.1 ("computer") is DTerm1.T.2 comprising "calculateur". In the example, the first language is English and the second language is French. A regular terminology dictionary will contain thousands of associated terms and the example of two terms is simplified for ease of describing the embodiment.

Figure 2C:
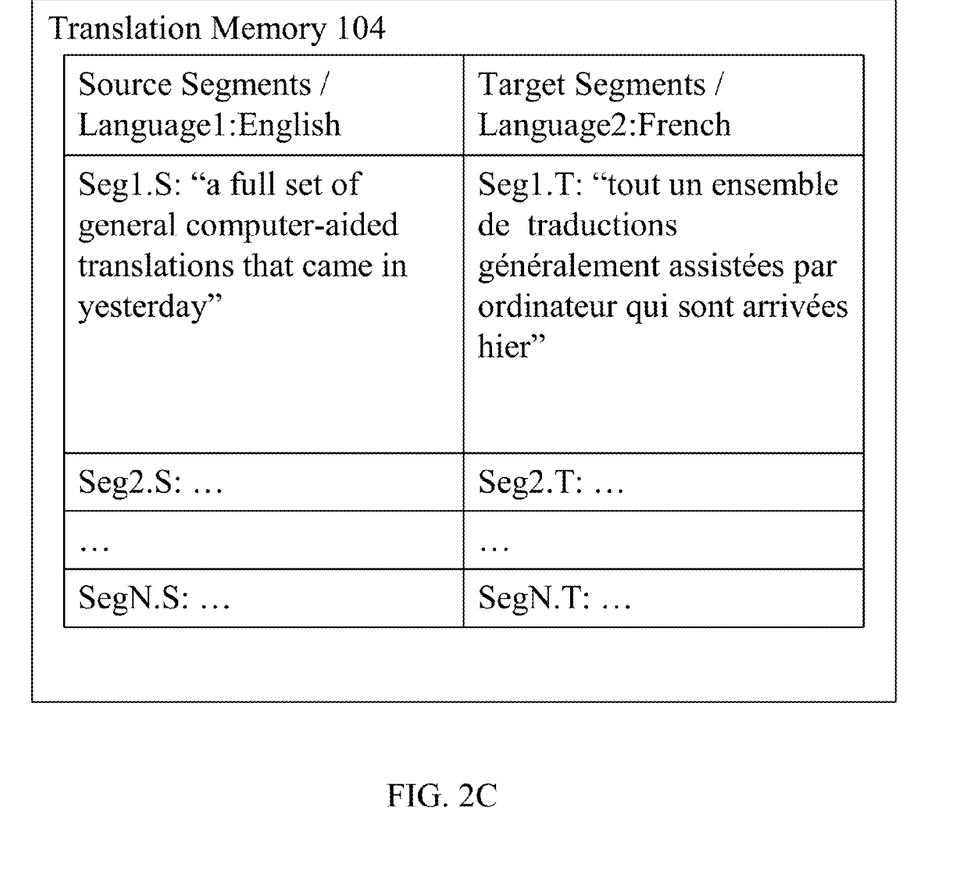

Referring to FIG. 2C, translation memory 104 comprises source segments of document in a first language and target segments of the translated document in a second language whereby the documents are split into corresponding segment pairs (Seg1.S/Seg1.T; Seg2.S/Seg2.T; . . . ; SegN.S/SegN.T). A source segment of text in the first language should be equivalent in meaning with a target segment of text in the second language. A normal translation memory will comprise thousands of associated segments and the example is simplified for ease of describing the embodiment.

Figure 2D:
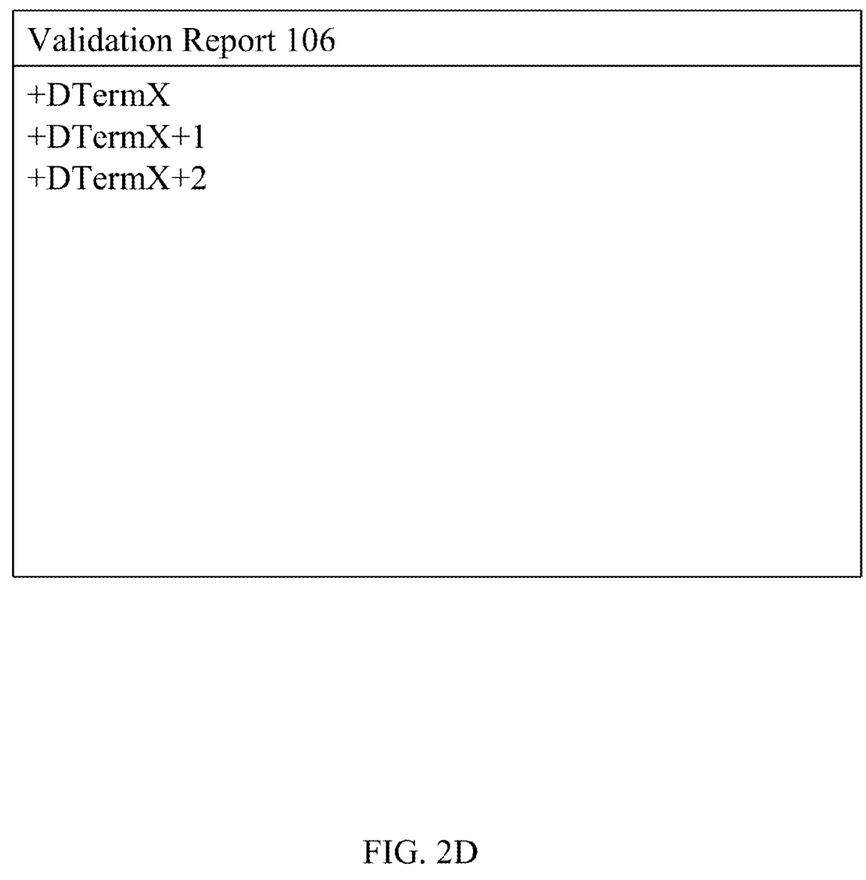

Referring to FIG. 2D, a validation report 106 comprises a structured list of segment pairs showing a measure of validation for each segment pair. The structured list comprises three sequential collapsed segments (indicated by a positive sign +) DTermX, DTermX+1 and DTermX+2 and in the following figures expanded segments (indicated by the minus sign −) are shown. In this example the report has no stylized style sheet associated with it and is shown in a plain text.

Figure 2E:
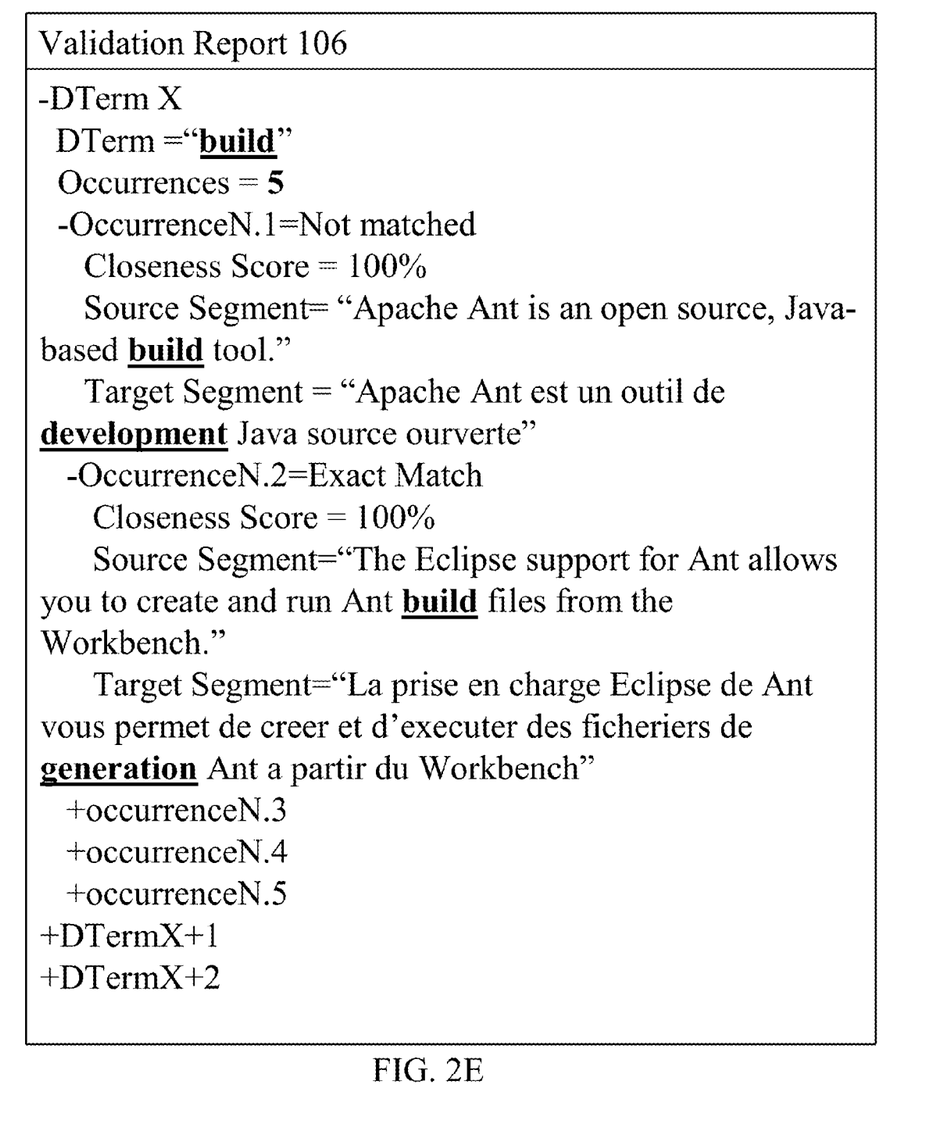

Referring to FIG. 2E, the same example validation report is expanded at DTermX to reveal the occurrences and match value of the dictionary term in the terminology memory. The bold underlined text highlights the DTermX pair as located in the target and source segment of the translation memory. DTermX+1 and DTermX+2 are shown collapsed. In the example, five occurrences of DTermX where DTTermX is the English work "build" are located. The first occurrence has a corresponding target segment exact match (closeness score=100%) for the corresponding target term "development". The second occurrence has a corresponding target segment exact (closeness score=100%) for a second corresponding target term "generation". The third, fourth and fifth occurrence are shown collapsed.

Figure 2F:
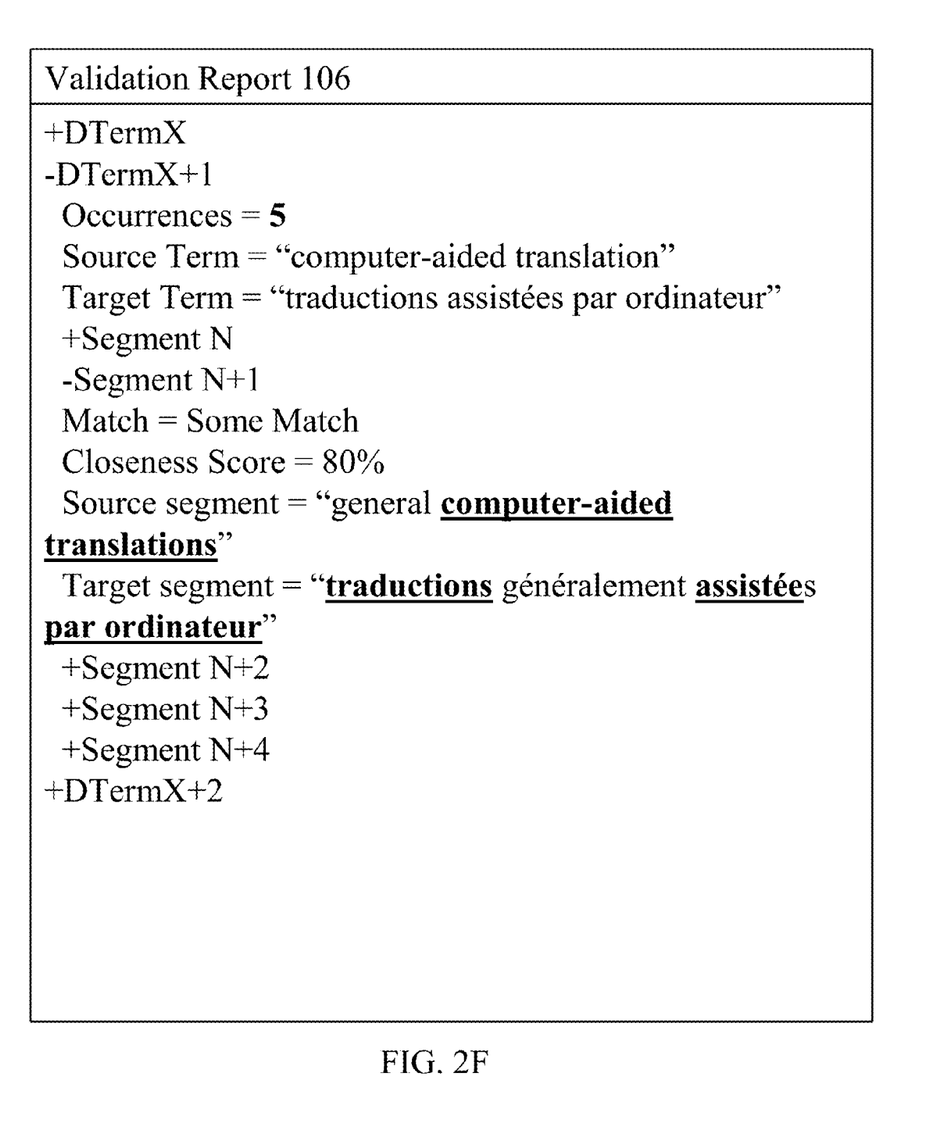

Referring to FIG. 2F, the same example validation report is expanded at DTermX+1 to reveal the occurrences of source term "computer-aided translation" in the translation memory. The bold underlined text highlights the DTermX+1 source term pair as located in the target and source segments of the translation memory. The example highlights the case where a corresponding target term is not exactly matched in a target segment but has a word (in this case "generalement") separating elements of the target term. In this case the closeness score is 80% for the less than exact march. DTermX and DTermX+2 are shown collapsed.

Figure 2G:
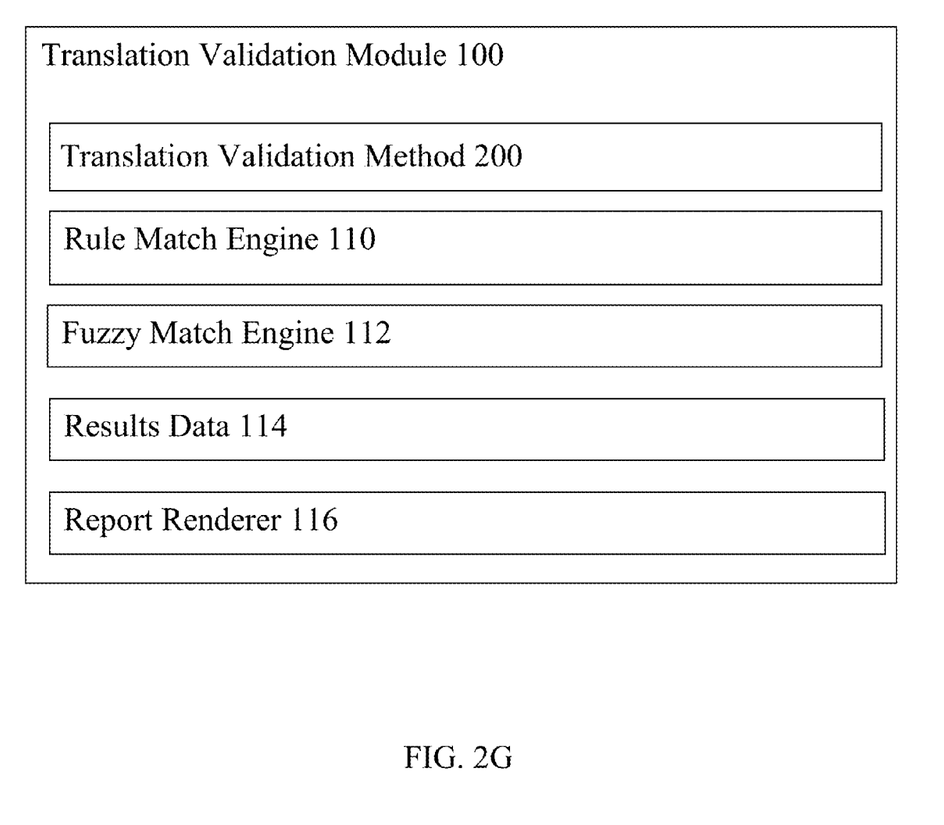

Referring to FIG. 2G, translation validation module 100 comprises: translation validation method 200; rule match engine 110; fuzzy match engine 112; results data 114; and report renderer 116.

Translation validation method 200 controls the processing and operation of the subcomponents of translation validation module 100 and is described in more detail below.

Rule match engine 110 is used for finding source terms in the source segments of translation memory. Located source terms have corresponding target terms in a terminology dictionary. Source segments have corresponding target segments in a translation memory.

Fuzzy match engine 112 is used for matching a corresponding target term (that is corresponding to a matched source term) with a corresponding target segment in the translation memory based on character string similarities (that is a target segment that corresponds to a source segment having an occurrence of the source term).

Results data 114 is for storing the results of the validation prior to being rendered as a report.

Report renderer 116 is for rendering a validation report 106 from results data 114.

Figure 3:
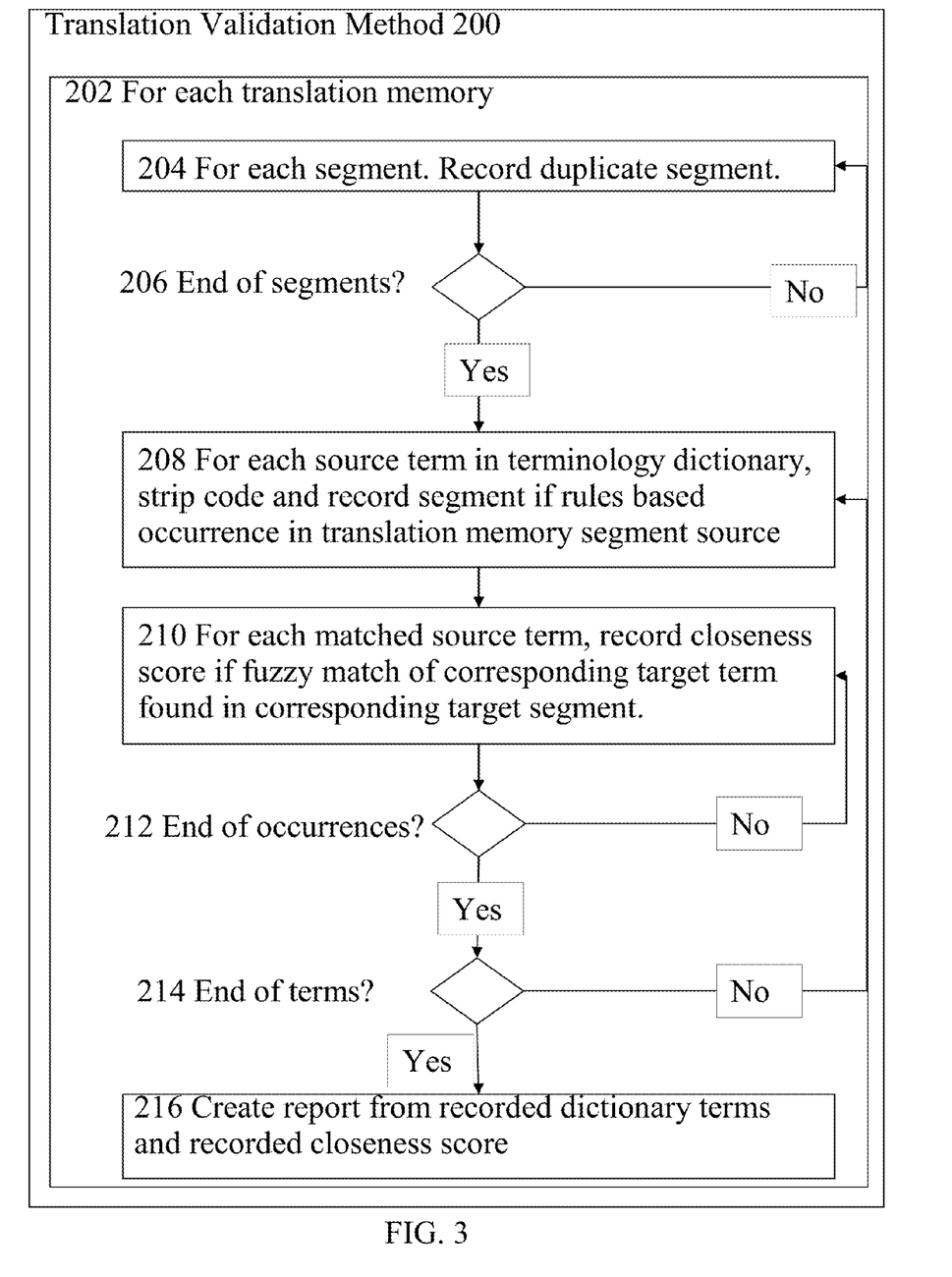
FIG. 3 is a flow diagram of a process of the preferred embodiment.

Referring to FIG. 3, translation validation method 200 comprises logical process steps 202 to 216.

Step 202 is for defining a loop so that each translation memory can be validated by steps 204 to 216. Only one translation memory is necessary for performance of the embodiment but two or more translation memories can be validated advantageously as a batch.

Step 204 is for defining a loop for all segments in a translation dictionary so that each segment is checked for duplication. Step 204 is also for recording and removing all duplicate segments from a translation memory. Thereby processing is not repeated for duplicate segments but all occurrences in including duplicated segments are reported.

Step 206 is for looping back to step 204 if there is one or more segments to process, else step 208.

Step 208 is for defining a testing loop for each source term in a terminology dictionary. Rule match engine 110 is invoked to test for rule base matches of each source term to a source segment in the translation memory. When a match is found then the occurrence in the segment is recorded with all the extraneous segment mark up stripped out. For instance, English terms are identified by comparing likely stems of words, stripping commonly used English endings, such as -s, -e, -es, -ies, -ed, -ing, and others in both dictionary entries and memory segments. Other morphological rules can also be used.

Step 210 is for defining a loop for each occurrence of a source term in a source segment whereby, after invoking fuzzy match engine 112, a fuzzy search is performed on the corresponding target segment and corresponding translated dictionary term to render a closeness score. A match is found if the translated dictionary term is located exactly in the target segment or if a closeness score falls within certain threshold limits. Otherwise no match is found. Additionally if the dictionary source term is found in the target segment then the match is recorded as "passed".

Fuzzy match engine 112 searches for canonical forms of the corresponding dictionary target term within corresponding target segments. According to closeness score, the translated term is considered as found, to be checked or not found. This assessment uses a language agnostic algorithm to detect fuzzy matches between 1) dictionary entry translations and 2) memory segment translations.

In the preferred embodiment, target term and target segment strings are compared using a function that determines the longest common chunks between them. When common chunks are found, then a further test based on three parameters is used to determine whether the expected target term is in the target segment. These three parameters are used to define as threshold such that a target term is considered as found in a target segment if:

The total number of signs in common substrings is at equal or above common-char-min (in percentage);
The total number of common chunks is equal or below chunk-number-max;
The number of signs of any common chunk is equal or above chunk-length-min. If any of these conditions is not met, the dictionary entry translation is considered as not found in the memory segment translation.

The threshold definition is set in a configuration file. In the case of European languages, the values of these parameters are as follows:

common-char-min=80%
chunk-number-max=3
chunk-length-min=2

No training phase is necessary to set these parameters. However, their values can be tested and changed if necessary.

Step 212 is for looping back to step 210 if there are more source term occurrences to process. Else step 214.

Step 214 is for looping back to step 208 if there are more source terms left to process, else step 216.

Step 216 is for creating a report of term occurrences and recorded closeness scores. This is the end of translation validation method 200.

Further embodiments of the invention are now described.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and components of the preferred embodiment may alternatively be embodied fully or partially in a parallel computing system comprising two or more processors for executing parallel software.

In an alternative embodiment, the present invention may be realized in the form of a computer implemented service comprising computer program code operable to, when deployed into a computer server infrastructure and executed thereon, cause the computer server infrastructure to perform all the steps of the method in response to a client request for the service.

Figure 4:
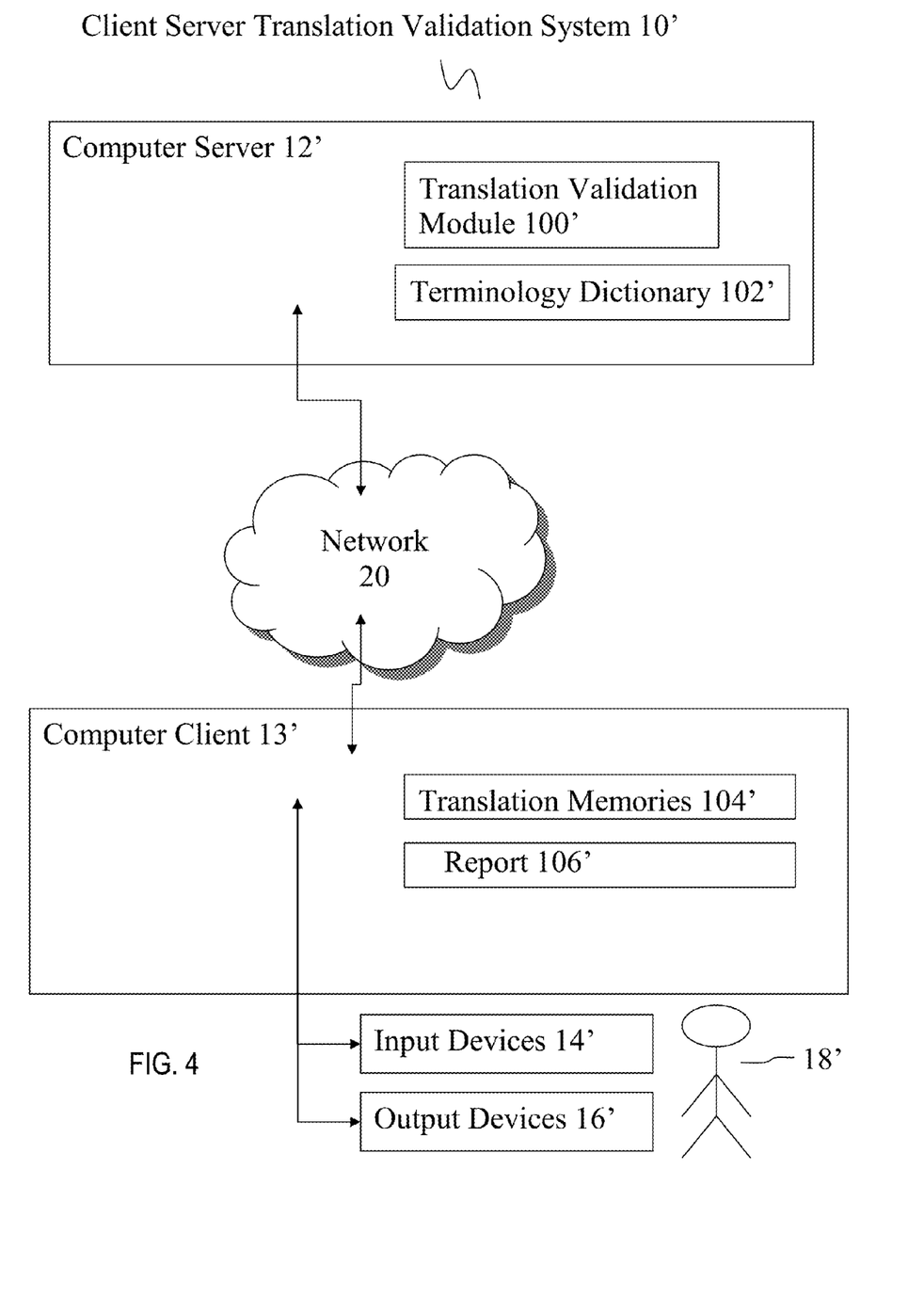
FIG. 4 is a deployment diagram of a client server computing embodiment.

For example, referring to FIG. 4, client server translation validation system 10' is an example client server embodiment comprising computer server 12' and computer client 13'. Computer server 12' connects to computer client 13' via network 20. Computer client 13' provides output via output devices 16' to user 18' and received input from user 18' via input devices 14'. In this client server embodiment the translation memories 104' are located on the client whereas the translation validation module 100' and the terminology dictionary 102' are located in the computer server 12'

In this client server embodiment validation is provided as a service to a client that provides the translation memory. Report 106' is produced in client 13' after successful completion of the validation.

As described herein, in a first aspect of the invention there is provided a method for validating a translation memory against a terminology dictionary, said terminology dictionary comprising source terms and corresponding target terms, said translation memory comprising source segments and corresponding target segments, said method comprising: identifying, for each source term, exact or close occurrences of that source term within source segments whereby a close match is according to grammar rules; calculating, for each identified source term occurrence in a source segment, a numerical closeness score between a corresponding target term and a corresponding occurrence of the corresponding target term in a corresponding target segment; and reporting each identified source term occurrence in a source segment and the calculated closeness score of the corresponding occurrence in target segment and the corresponding target term.

The embodiments provide a simple and generalized answer to flexible terminology form recognition. Most terms can appear in the target (and source) as flexible forms (for example a singular term and plural term both having the same root term). The absence of exact matches between the dictionary provided and the target text does not mean that the translation is inexact. So, the embodiments count and measure correspondences between terms and allow flexible forms in a source language to be matched to flexible forms in the target language.

Identifying terms that match or nearly match according to grammar rules (for example grammar rules for suffix variations of words) is less computationally intensive than calculating closeness values of character strings. This allows the embodiments to check for every term in the terminology dictionary to see if it is included in a translation memory in a much shorter time frame than when looking for a closeness score. Once the occurrences have been located then a more processor intensive calculation can be performed on a smaller subset of data. This two stage validation allows the processing to be achieved quickly and in real time.

The solution requires that the terminology dictionary provided be processed as a whole so as to provide global measures and stats.

Advantageously, each closeness score is categorized as: exact; some match; and no match.

More advantageously, an identified source term is categorized as 'used' if it matches the target term without translation.

Even more advantageously, the method further comprises rendering a report using a style sheet to provide increased ease of user navigation and understanding. Such a style sheet provides a visual tool to allow fast identification of problematic areas. For instance, data may be recorded as extendable markup language (XML) data and then rendered in a visually useful way using extendable style sheet language (XSL) to provide side by side comparison of source and target segments containing a highlighted corresponding dictionary term with matching or partial matching term.

Most advantageously, markup colors are used to distinguish between different closeness categories.

Preferably, the method further comprises calculating an overall closeness of match between the translation memory and the translation dictionary using the individual closeness values.

This helps a user understand how much work needs to be performed on translation revision and can be calibrated in person hours.

More preferably, the method further provides a visual tool allowing fast identification of problem areas.

To avoid defining morphology rules for potential source languages, while still minimizing the number of candidate matches to classify manually, the embodiments rely on a set of assumptions and fuzzy match methods to provide a service based on extensive morphological knowledge. The source language is a single language having simple grammar rules. For instance, the English language is relatively simple and well formalized, in particular much of the grammar is suffix based and hence it is easy to detect canonical entries from the source. However, the embodiments are language agnostic and rely on a set of pattern matching rules which for the most part, extract and compare the root of a terminology entry and the word. The embodiments have been designed to use bilingual terminology dictionaries and bilingual translation memories in specific formats as input but terminology dictionaries and translation memories with two or more target languages are envisaged. Although it is preferable to use a source language with a simple suffix based grammar there is no constraint on the target language.

In similar use case, terminologists need to rapidly assess the terminological accuracy of a translated text with a complete terminology consistency report. This can be done manually term by term at a high cost. It is a very slow and error prone process.

The embodiments will spot all occurrences of each source language term from the terminology dictionary across the set of translation memories and determine for each occurrence whether it is correctly translated. The status of each segment according to the correctness of the terminology used is determined by the embodiments. As a result, all occurrences that need to be changed are identified and shown to the user in an HTML file. In addition, segments with non-matching terminology are numbered and the effort necessary to put translation in conformity with the dictionary can be assessed.

The embodiments operate at the machine level of the computer as they are transparent to any translation applications operating at an application level. Using the embodiments, instead of know verification tools, leads to an increase in the speed or reliability of the computer because of a computationally efficient operation of the verification.

In a second aspect of the invention there is provided a system for validating a translation memory against a terminology dictionary, said translation dictionary comprising source terms and corresponding target terms, said translation memory comprising source segments and corresponding target segments, said system comprising: a rule match engine for identifying, for each source term, exact or close occurrences of that source term within source segments whereby a close match is according to grammar rules; a fuzzy machine engine for calculating, for each identified source term occurrence in a source segment, a numerical closeness score between a corresponding target term and a corresponding occurrence of the corresponding target term in a corresponding target segment; and a report generator for reporting each identified occurrence of a source term in a source segment; the corresponding target term; the corresponding occurrence of the corresponding target term in a target segment; and the calculated closeness score.

In a third aspect of the invention there is provided a computer program product for validating a translation memory against terminology dictionary of a source and target language, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a digital computer, comprising software code portions, when said program is run on a computer, for performing all the steps of the method claims.

In a fifth aspect of the invention there is provided a data carrier aspect of the preferred embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

In a further alternative embodiment, the present invention may be realized in the form of a computer implemented method of deploying a service comprising steps of deploying computer program code operable to, when deployed into a computer server infrastructure and executed thereon, cause the computer system to perform all the steps of the method in response to a client request for the service.

It will be clear to one skilled in the art that many improvements and modifications can be made to the foregoing exemplary embodiment without departing from the scope of the present invention.

What is claimed is:

1. A system for validating a translation memory against a terminology dictionary, wherein said terminology dictionary comprises source terms and corresponding target terms, wherein a target term is a translation of a source term found in said terminology dictionary, wherein said translation memory comprises source segments and corresponding target segments, wherein said source segments are a combination of source terms plus additional words, wherein target segments are translations of source segments, and wherein said system comprises:

a rule match hardware engine for identifying, for each source term, occurrences of a particular source term within source segments, wherein a context of each of the occurrences is determined according to grammar rules;

a fuzzy match hardware engine for calculating, for each identified source term occurrence in a source segment, a closeness score between said each identified source term occurrence and a corresponding occurrence of a corresponding target term in a target segment;

a report generator for reporting each identified occurrence of a source term in a source segment, and a closeness score, for said each identified source term occurrence, between said each identified source term occurrence and a corresponding target term in a target segment; and one or more processors, wherein said one or more processors predict whether an expected target term corresponding to a particular source term is in the target segment based on:

a percentage of characters common to sub strings in the target term and the target segment exceeding a common character minimum percentage, wherein a common sub string is a same set of characters used in the target term and the target segment;

a quantity of chunks from the target term found in the target segment being below a maximum chunk number, wherein a chunk is a portion of the target term, wherein portions of the target term are separated by non-target term words in the target segment to form one or more chunks; and a quantity of characters in any common chunk between the target term and the target segment being above a chunk length minimum; and a rendering hardware engine for rendering a style sheet, wherein the style sheet provides a visual tool to allow visual identification of problematic areas by providing side by side comparison of source segments and target segments that both contain a same highlighted dictionary term.

2. The system according to claim 1, wherein each closeness score is categorized as: exact; some match; or no match.

3. The system according to claim 2, wherein an identified source term is categorized as "used" in response to the identified source term being found in the corresponding target segment as well as the source segment.

4. The system according to claim 2, wherein markup colors are used to distinguish between different closeness score categories.

5. The system according to claim 1, further comprising:
a calculation hardware logic for calculating an overall closeness score between the translation memory and the terminology dictionary using individual closeness scores.

6. The system according to claim 1, further comprising:
a visualization hardware tool for providing a visual tool that provides identification of predetermined problem areas.

7. The system according to claim 1, wherein a source language of a source term is a single language having suffix based grammar rules.

8. The system according to claim 7, wherein the source language is English.

9. A method for validating a translation memory against a terminology dictionary, wherein said terminology dictionary comprises source terms and corresponding target terms, wherein said source terms and said corresponding target terms are strings of one or more words, wherein a target term is a translation of a source term found in said terminology dictionary, wherein said translation memory comprises source segments and corresponding target segments, wherein said source segments are a combination of source terms plus additional words, wherein the source segments have been translated into the corresponding target segments, and wherein said method comprises:

identifying, by one or more processors and for each source term, occurrences of a particular source term within source segments in the terminology dictionary, wherein a context of each of the occurrences is determined according to grammar rules;

calculating, by one or more processors and for each identified source term occurrence in a source segment, a closeness score between a corresponding target term and a corresponding occurrence of the corresponding target term in a target segment;

reporting, by one or more processors, each identified occurrence of a source term in a source segment, and a closeness score, for said each identified occurrence, between said each identified occurrence and a corresponding target term in a target segment;

predicting, by one or more processors, whether an expected target term corresponding to a particular source term is in the target segment based on:
a percentage of characters common to sub strings in the target term and the target segment exceeding a common character minimum percentage, wherein a common sub string is a same set of characters used in the target term and the target segment;

a quantity of chunks from the target term found in the target segment being below a maximum chunk number, wherein a chunk is a portion of the target term, wherein portions of the target term are separated by one or more non-target term words in the target segment to form one or more chunks; and a quantity of characters in any common chunk between the target term and the target segment being above a chunk length minimum; and rendering, by one or more processors, a style sheet, wherein the style sheet provides a visual tool to allow visual identification of problematic areas by providing side by side comparison of source segments and target segments that both contain a same highlighted dictionary term.

10. The method according to claim 9, wherein each closeness score is categorized as: exact; some match; or no match.

11. The method according to claim 9, wherein an identified source term is categorized as "used" if it is found in a target segment as well as a corresponding source segment.

12. The method according to claim 10, wherein markup colors are used to distinguish between different closeness score categories.

13. The method according to claim 9, further comprising:
calculating, by one or more processors, an overall closeness between the translation memory and the terminology dictionary using the individual closeness scores.

14. The method according to claim 9, wherein a source language of the source term is a single language having suffix based grammar rules.

15. The method of claim 9, further comprising:
calculating, by one or more processors and for each identified source term occurrence in a source segment, the closeness score based on how many words are inserted within an accurate translation of an identified source term for the corresponding target term in the target segment.

* * * * *